2 Sheets—Sheet 1.

W. HAWKINS.
Machines for Forming Insertible Saw-Teeth.

No. 196,800. Patented Nov. 6, 1877.

WITNESSES:
C Clarence Poole.
DeWitt C. Allen.

INVENTOR:
William Hawkins
by attys.
A H Evans & Co.

2 Sheets—Sheet 2.
W. HAWKINS.
Machines for Forming Insertible Saw-Teeth.
No. 196,800. Patented Nov. 6, 1877.
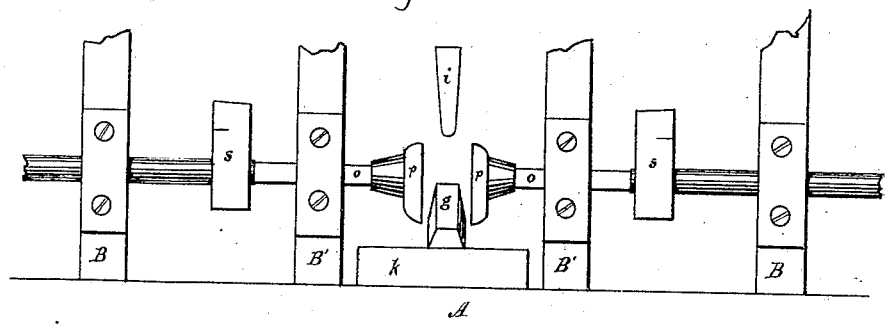
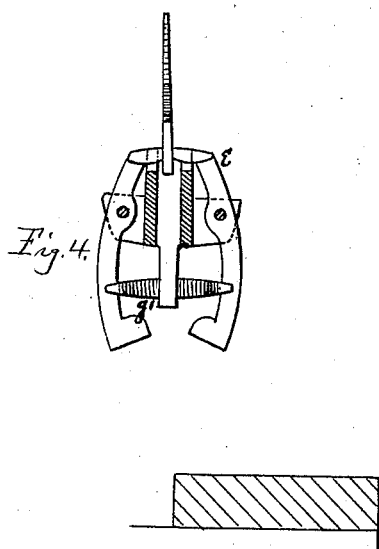
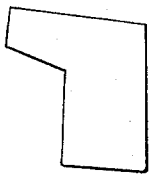
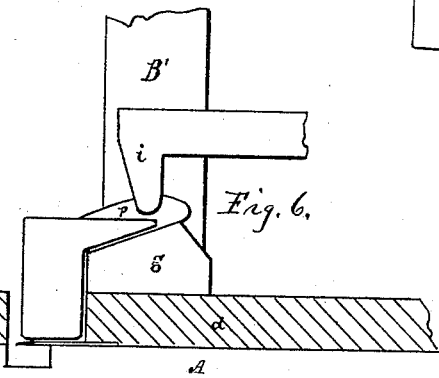
Witnesses
Geo. H. Strong.
Jno. L. Boone
Inventor
William Hawkins
by
Dewey & Co.
Attys.

UNITED STATES PATENT OFFICE.

WILLIAM HAWKINS, OF SAN FRANCISCO, CALIFORNIA.

IMPROVEMENT IN MACHINES FOR FORMING INSERTIBLE SAW-TEETH.

Specification forming part of Letters Patent No. 196,800, dated November 6, 1877; application filed July 9, 1877.

*To all whom it may concern:*

Be it known that I, WILLIAM HAWKINS, of the city and county of San Francisco, and State of California, have invented a Machine for Forging and Forming Insertible Saw-Teeth; and I do hereby declare the following to be a full, clear, and exact description thereof, reference being had to the accompanying drawings.

My invention relates to a machine for forging and shaping the points of insertible saw-teeth; and it consists of a tooth-holder and anvil, in combination with a series of hammers, which operate simultaneously upon both sides, and alternately upon the upper edge of the tooth-point, so as to spread and form the tooth with great facility and uniformity.

Figure 1:
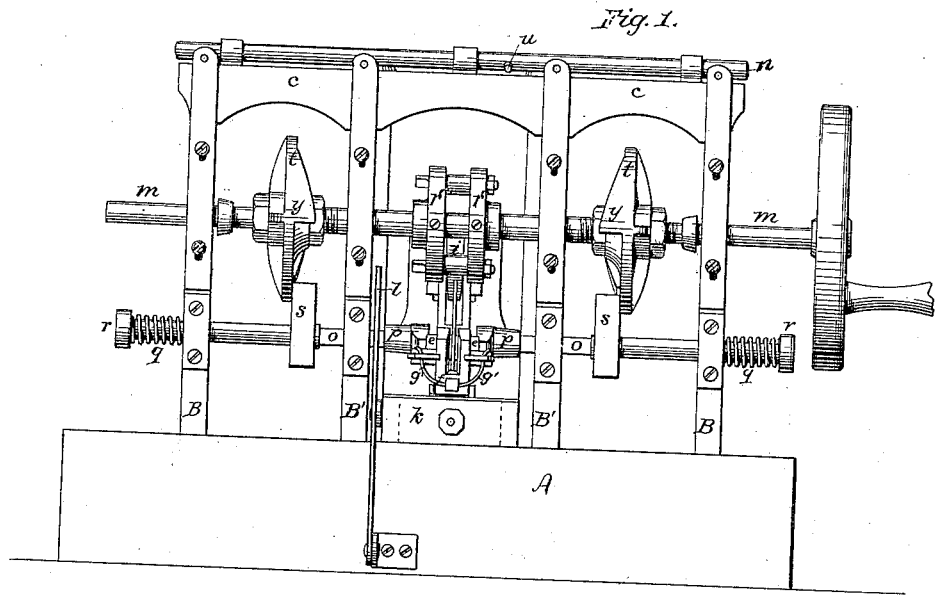
Figure 2:
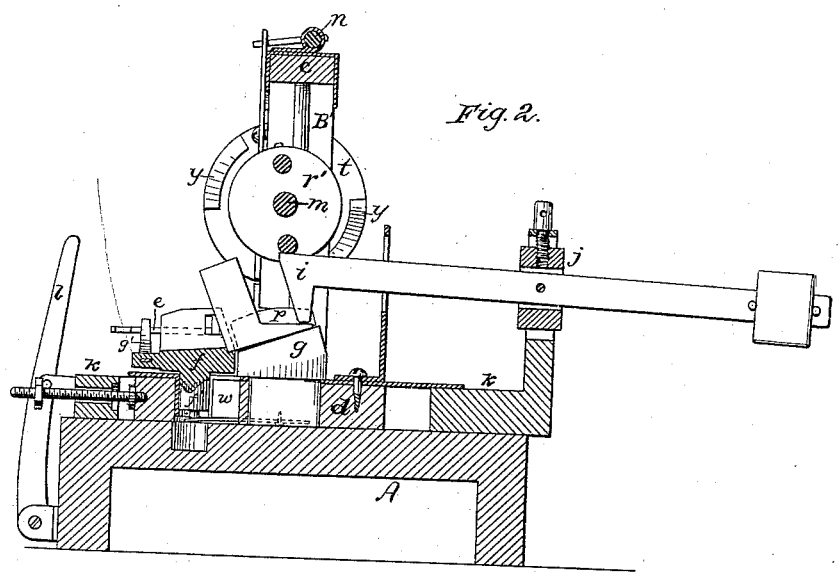

Referring to the accompanying drawings, Figure 1 is a side view, and Fig. 2 a sectional view, of my device. Figs. 3, 4, 5, and 6 are detail views.

Let A represent the base of my machine, upon which the four uprights B B B' B' are secured. $c$ is a cross-beam, which connects the upper ends of the uprights together, and gives them permanency. Transversely across the base A, and between the middle uprights B' B', I construct a platform, $d$, upon which the tooth-holder and anvil are secured.

The tooth-holder may be variously made; but I have represented two horizontally-operated pinching-jaws, $e\ e$, attached to the opposite sides of a channeled block, $f$. This channeled block has a stem, $f'$, which enters a bore or hole in the platform $d$. In the bottom of this bore is a spring, upon which the stem $f'$ rests, for the purpose of giving a rebound to the holder, for the purpose hereinafter explained. The anvil $g$ is placed in front of this tooth-holder, and directly between the two middle uprights B' B', its upper face being inclined toward the tooth-holder, so that when a saw-tooth blank has been inserted between the jaws $e\ e$, with its back edge resting upon the inclined face of the anvil, the opposite edge or throat of its point will be in a horizontal plane, or nearly so.

The jaws $e\ e$ are clamped upon the back edge of the saw-tooth by means of a spring, $g'$, or equivalent device, so that the tooth is kept in the proper position while its point is being forged.

The forming implements consist of three hammers, one of which acts vertically upon the upper edge of the tooth, while the other two are operated horizontally and simultaneously against the sides of the tooth. These hammers may be operated by any suitable and convenient means, a number of which will readily suggest themselves to the skilled mechanic. The vertically-operating hammer $i$, however, must be attached to a slide, in order to give it a range of blows equal to the length of the tooth-point to be drawn out. In the present instance this slide is a frame, $k$, and the hammer handle or shank is suspended from a standard, $j$, at its rear end. The frame encircles the platform $d$, and is moved back and forward by means of a hand-lever, $l$, at the front end of the machine, convenient to the workman. $m$ is the driving-shaft, to which the power is applied. This shaft is supported in adjustable boxes, which can be raised or lowered by a rock-shaft, $n$, and lever $u$ on top of the cross-beam $c$, with which they are connected, for the purpose hereinafter specified.

The side or compressing hammers are mounted horizontally below the driving-shaft, one on each side of the saw-tooth. Each one consists of a rod, $o$, which has a metal head, $p$, the striking-face of which is flat. A spring, $q$, is coiled around the outer end of each shaft, between an enlarged head, $r$, and the outside upright of the frame, and an arm, $s$, is attached to each hammer, between the two outside uprights. Directly over the anvil a cam-wheel, $r'$, is secured to the driving-shaft $m$, the arms of which wheel strike the hammer $i$ successively as the driving-shaft rotates, and force it down against the upper edge of the saw-tooth blank. A wheel, $t$, is secured on the driving-shaft $m$, directly over the arm $s$ of each horizontal hammer. On the side of each of these wheels one or more inclined lugs or cams, $y$, are found, so that as the shaft $m$ rotates, these cams will strike the arms $s$ and force the heads $p$ against the opposite sides of the tooth. The cams are so adjusted that the two horizontal hammers operate simultaneously, while the vertical hammer operates alternately with them. The force of the blows delivered by the vertically-operating hammer is regulated by raising or lowering the driving-shaft by means of the lever $u$ and the rock-shaft $n$, while the wheels $t$ can be shifted to or from the arms $s$ by means of set-nuts, in order to regulate the stroke or compression of the horizontal hammers.

In forging a saw-tooth with this machine, the saw-tooth blank represented at Figs. 1 and 2, when heated, is placed upon the anvil with its throat-edge upward, and the pinching-holders are clamped on its back edge to hold it in place. The machine being set in motion, the operator grasps the lever $l$, and moves the hammer $i$ to the base of the point of the tooth. The hammers then alternate, the hammer $i$ upsetting or spreading the tooth-edge, working from its base toward its point, while the side or horizontal hammers or compressors prevent buckling, and shape the sides. After each stroke of the vertical hammer $i$, the spring upon which the channeled block $f$ is supported rebounds, and lifts the point of the tooth above the face of the anvil, so that the side compressing hammers act against the full side of the tooth; or the anvil might be made to rise and lower slightly, while the tooth remained fixed. The workman gradually moves the hammer $i$ toward the point of the tooth, shaping and forming as it goes until the point is finished.

It is evident that the devices herein employed may be variously arranged and operated—that is, cams might be used for withdrawing the horizontal hammers, and at the same time condensing the springs, so that the force of the blow would be given by the springs, instead of by the cam; or various other methods might be suggested. The main feature of my invention, however, is the arrangement and method of operating and controlling the hammers for forming the points of saw-teeth.

The tooth-holder or channeled block $f$ can be removed from the platform, if desired. A slot, $w$, is made in the platform $d$, directly in front of the bore in which the spindle or stem $f'$ of the channeled block enters, into which the body of the tooth can be dropped, so as to let the throat-edge of the tooth rest upon the anvil, while its base rests upon the spring in the bottom of the bore. A suitable holder will be employed to hold the tooth in this position. This presents the back of the tooth to the action of the vertical hammer, so that both edges can be spread equally.

This machine is simple and easily managed, and will forge the points of saw-teeth with great facility and uniformity.

Having thus described my invention, what I claim, and desire to secure by Letters Patent, is—

1. The combination of an anvil, $g$, saw-tooth holder $e\ \bar{e}$, vertically operating and adjustable hammer $i$, and the horizontal side compressing or forming hammers $o\ p$, combined, arranged, and operated substantially as and for the purpose above described.

2. The hammer $i$, attached to a slide operated by the lever $l$, in combination with two horizontally-moving hammers, $o\ p$, substantially as and for the purpose described.

In witness whereof I have hereunto set my hand and seal.

WILLIAM HAWKINS. [L. S.]

Witnesses:
FRANK A. BROOKS,
E. R. ANDERSON.